(12) United States Patent
Stenlund

(10) Patent No.: US 11,501,585 B2
(45) Date of Patent: Nov. 15, 2022

(54) REQUESTING ACCESS TO A PHYSICAL SPACE CONTROLLED BY AN ELECTRONIC LOCK ASSOCIATED WITH A TAG

(71) Applicant: ASSA ABLOY AB, Stockholm (SE)

(72) Inventor: Peter Stenlund, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/756,744

(22) PCT Filed: Oct. 23, 2018

(86) PCT No.: PCT/EP2018/078974
§ 371 (c)(1),
(2) Date: Apr. 16, 2020

(87) PCT Pub. No.: WO2019/081472
PCT Pub. Date: May 2, 2019

(65) Prior Publication Data
US 2021/0192877 A1  Jun. 24, 2021

(30) Foreign Application Priority Data
Oct. 24, 2017  (EP) ..................................... 17198088

(51) Int. Cl.
*G07C 9/00* (2020.01)
*G07C 9/26* (2020.01)

(52) U.S. Cl.
CPC .......... *G07C 9/00309* (2013.01); *G07C 9/26* (2020.01)

(58) Field of Classification Search
None
See application file for complete search history.

(56) References Cited

U.S. PATENT DOCUMENTS

| 8,099,380 | B1* | 1/2012 | Shahabi | H04W 4/023 706/62 |
| 8,469,270 | B1* | 6/2013 | Rothschild | G06F 3/167 235/385 |
| 9,762,581 | B1 | 9/2017 | Wang et al. | |
| 10,121,033 | B1* | 11/2018 | Robshaw | G06K 7/10198 |

(Continued)

FOREIGN PATENT DOCUMENTS

| CN | 101256619 | 9/2008 |
| CN | 103731485 | 4/2014 |

(Continued)

OTHER PUBLICATIONS

Extended Search Report for European Patent Application No. 17198088.1, dated Apr. 16, 2018, 7 pages.

(Continued)

*Primary Examiner* — Carlos Garcia
(74) *Attorney, Agent, or Firm* — Sheridan Ross P.C.

(57) ABSTRACT

According to a first aspect, it is presented a method for requesting access to a physical space controlled by an electronic lock. The method is performed in a user device and comprises the steps of: reading a tag using a near field radio protocol, yielding a tag identifier, the tag being distinct from the electronic lock; finding, based on the tag identifier, a lock identifier associated with the tag identifier, wherein the tag identifier is distinct from the lock identifier; and sending an access request message to the electronic lock having the lock identifier.

14 Claims, 3 Drawing Sheets

(56) References Cited

U.S. PATENT DOCUMENTS

| | | | |
|---|---|---|---|
| 10,573,171 B2* | 2/2020 | VanBlon | G06F 3/011 |
| 2005/0184150 A1 | 8/2005 | Welte et al. | |
| 2014/0375422 A1 | 12/2014 | Huber et al. | |
| 2015/0356801 A1* | 12/2015 | Nitu | G07F 9/001 |
| | | | 340/5.61 |
| 2018/0262891 A1* | 9/2018 | Wu | G07C 9/00857 |
| 2018/0350177 A1* | 12/2018 | Dautz | G07C 9/00912 |
| 2019/0122293 A1* | 4/2019 | Minsely | E05B 65/48 |

FOREIGN PATENT DOCUMENTS

| | | |
|---|---|---|
| CN | 103971435 | 8/2014 |
| CN | 104221062 | 12/2014 |
| CN | 105488918 | 4/2016 |
| CN | 107004317 | 8/2017 |
| CN | 107031566 | 8/2017 |
| NL | 2015145 | 2/2017 |
| WO | WO 2016/166362 | 10/2016 |

OTHER PUBLICATIONS

International Search Report and Written Opinion for International (PCT) Patent Application No. PCT/EP2018/078974, dated Jan. 10, 2019, 13 pages.
International Preliminary Report on Patentability for International (PCT) Patent Application No. PCT/EP2018/078974, dated Sep. 20, 2019, 12 pages.
English Translation of Official Action for China Patent Application No. 201880068843.1, dated May 21, 2021, 14 pages.
Official Action for European Patent Application No. 18786812.0, dated May 21, 2021, 8 pages.
English Translation of Official Action for China Patent Application No. 201880068843.1, dated Mar. 22, 2022, 9 pages.
English Translation for China Patent Application No. 201880068843.1, dated Jul. 15, 2022, 11 pages.

* cited by examiner

REQUESTING ACCESS TO A PHYSICAL SPACE CONTROLLED BY AN ELECTRONIC LOCK ASSOCIATED WITH A TAG

CROSS REFERENCE TO RELATED APPLICATIONS

This application is a national stage application under 35 U.S.C. 371 and claims the benefit of PCT Application No. PCT/EP2018/078974 having an international filing date of 23 Oct. 2018, which designated the United States, which PCT application claimed the benefit of European Patent Application No. 17198088.1 filed 24 Oct. 2017, the disclosure of each of which are incorporated herein by reference.

TECHNICAL FIELD

The invention relates to a method, user device, computer program and computer program product for requesting access to a physical space controlled by an electronic lock, where the electronic lock is associated with a tag.

BACKGROUND

With online shopping steadily increasing, deliveries of physical goods are also to increasing. Consumers want fast and cheap delivery and the delivery companies want efficiency and safety for their deliveries.

Thefts from delivery vehicles and attacks against drivers are increasing since the value of the goods increases.

Current security solutions for delivery vehicles rely on traditional vehicle locks or even padlocks. Moreover, the prior art solutions are both inconvenient for the drivers and in many cases insecure

SUMMARY

It is an object to improve security and driver convenience for electronic locks of a vehicle.

According to a first aspect, it is presented a method for requesting access to a physical space controlled by an electronic lock. The method is performed in a user device and comprises the steps of: reading a tag using a near field radio protocol, yielding a tag identifier, the tag being distinct from the electronic lock; finding, based on the tag identifier, a lock identifier associated with the tag identifier, wherein the tag identifier is distinct from the lock identifier; and sending an access request message to the electronic lock having the lock identifier.

The step of finding a lock identifier may comprise using a lookup table to find the lock identifier associated with the tag identifier.

The user device may be a wearable device.

The physical space may be within a vehicle, such as a cargo vehicle.

According to a second aspect, it is presented a user device for requesting access to a physical space controlled by an electronic lock. The user device comprises: a processor; and a memory storing instructions that, when executed by the processor, cause the user device to: read a tag using a near field radio protocol, yielding a tag identifier, the tag being distinct from the electronic lock; find, based on the tag identifier, a lock identifier associated with the tag identifier, wherein the tag identifier is distinct from the lock identifier; and send an access request message to the electronic lock having the lock identifier.

The instructions to find a lock identifier may comprise instructions that, when executed by the processor, cause the user device to use a lookup table to find the lock identifier associated with the tag identifier.

The user device may be a wearable device.

The physical space may be within a vehicle.

According to a third aspect, it is presented a computer program for requesting access to a physical space controlled by an electronic lock. The computer program comprises computer program code which, when run on a user device, causes the user device to: read a tag using a near field radio protocol, yielding a tag identifier, the tag being distinct from the electronic lock; find, based on the tag identifier, a lock identifier associated with the tag identifier, wherein the tag identifier is distinct from the lock identifier; and send an access request message to the electronic lock having the lock identifier.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that tags (such as RFID (Radio Frequency Identification) tags) can be used for physical locks, but only for indicating intent. The user device reads the tag, finds which electronic lock is associated with the tag and requests access directly to the lock. Using a tag for intent and the electronic lock for access allows for great accuracy of intent without reducing the flexibility of an electronic lock. Moreover, the tag identifier and the lock identifier are different, allowing the use of generic tags during installation, as long as the association with each pair of tag identifier and lock identifier is recorded.

A user 1 is a logistics person associated with a vehicle 20, for instance the currently assigned driver of the vehicle. The vehicle 20 is a cargo vehicle suitable for carrying cargo and can be a van, a lorry, a car, etc. The cargo can be loaded in the vehicle 20 e.g. in the form of boxes, optionally on pallets.

Figure 1:
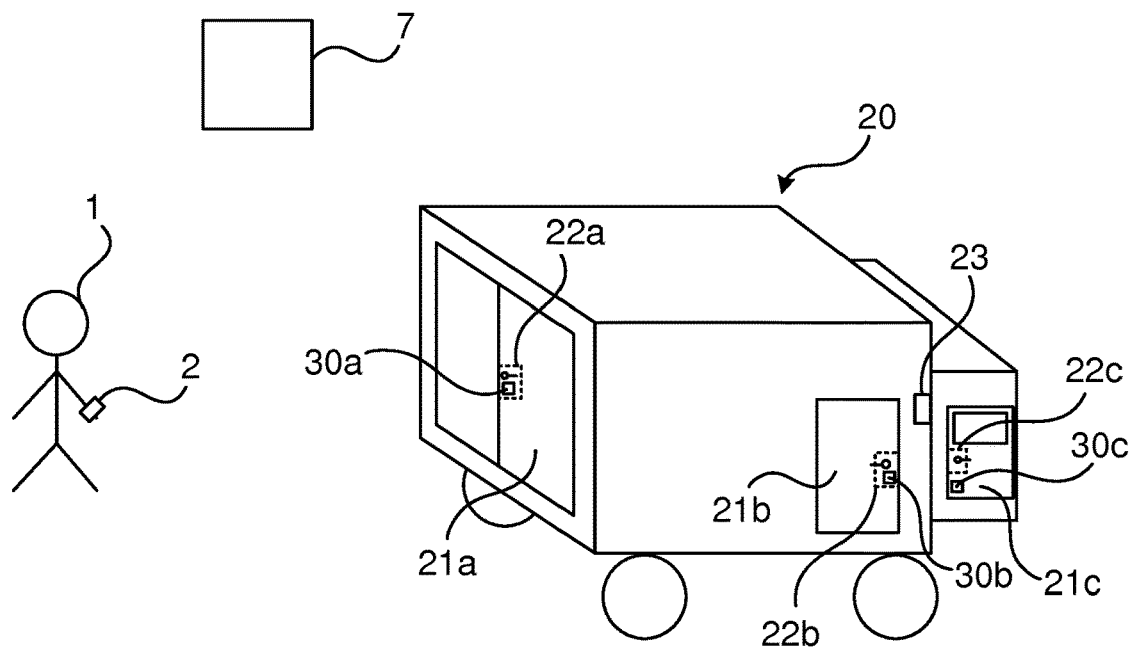
FIG. 1 is a schematic diagram illustrating an environment in which embodiments presented herein can be applied.

The vehicle 20 is provided with a back door 21a and one or more cabin doors 21C (only one seen in FIG. 1). The function of the back door 21a can equally well be performed by a tail lift and/or roller shutter. Optionally, a side door 21b for access to the cargo area of the vehicle is provided.

The back door 21a is secured by a first electronic lock 22a, the cabin door(s) 21c are secured by a third electronic lock 22C and the optional side door 21b is secured by an optional second electronic lock 22b. Optionally, an electronic access control device 23 controls access to operation of the vehicle, corresponding to an ignition key.

The user 1 carries a user device 2, here in the form of a wearable device. A wearable device is an electronic device which can be worn by the user. For instance the wearable device can be in the form of a wristband or watch. As explained in more detail below, the user device 2 is used to identify the user 1 using biometric sensors.

An access manager 7 is a computer which is used to allocate access to the user 1 as needed, to be able to open the electronic locks 22a-c. The user device 2 can communicate with the access manager 7, e.g. using a cellular network module within the user device 2 or via a smartphone connected with the user device 2 over a short range wireless link.

A usage scenario in the environment illustrated in FIG. 1 will now be described.

At the start of a shift, the user 1 reports to a logistics centre, at which the user is assigned a vehicle and a delivery schedule for the day. The user accepts by identifying him/herself using the user device.

In order to open the door to the cabin of the vehicle, the user reads a tag by the door lock with the user device. The user device finds which electronic lock is associated with the tag and sends a request to open in a message to the electronic lock.

In one embodiment, the lock has previously been paired with a smartphone (or other personal user device) of the lock owner. The lock identifier is then stored in the smartphone. The tag identifier is retrieved by the smartphone. An association between the tag identifier and the lock identifier is established and this association is stored for use in this method. The association between the tag identifier and the lock identifier can be stored centrally (in the cloud) and may also be propagated to user devices to allow offline use.

The user may also be required to identify him/herself using the wearable device. The electronic lock verifies that the user is allowed access and if this is affirmative, the electronic lock is unlocked so that the user can open the door.

Optionally, the vehicle can be started only after the user has provided identification on the user device.

Once the user arrives at a delivery location, the user exits the cabin and walks around to the back of the vehicle. The lock of the back door is again opened by the user reading the tag, this time by the lock of the back door. When the user has picked up the item to be delivered, e.g. a parcel, the user exits the vehicle and locks the back door by reading the tag by the back door again. Alternatively, the back door is locked every time it is closed.

Figure 2:
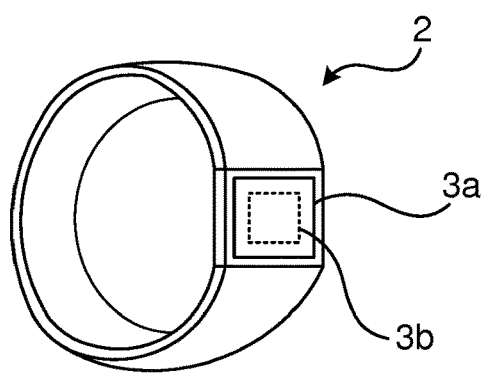
FIG. 2 is a schematic diagram illustrating an embodiment of a user device of FIG. 1.

FIG. 2 is a schematic diagram illustrating an embodiment of a user device 2 of FIG. 1 in the form of a wristband. The user device 2 comprises a first biometric sensor 3a for obtaining first biometric data and a second biometric sensor 3b for obtaining second biometric data. The second biometric sensor 3b captures second biometric data comprising a finger pressure parameter.

The user device 2 is configured to determine an identity of the user 1 based on the first biometric data and the second biometric data.

By measuring the finger pressure, an additional biometric parameter is captured which is difficult to copy and easy for the user to remember. The finger pressure parameter can be a curve of how the finger pressure varies over time, which improves the accuracy of identifying the user. The specific finger pressure pattern for the user needs to be captured initially, and may need to be periodically calibrated over time.

In this embodiment, the user device 2 is in the form of a wristband, to be worn around the wrist of the user.

The first biometric sensor 3a can be a fingerprint sensor. This allows for convenient identification of the user, e.g. by comparing a captured fingerprint with one or more templates.

Optionally, the first biometric sensor 3a is a blood flow sensor. The blood flow sensor captures the blood flow, which varies over time in a user specific manner. Hence, the blood flow over time can be compared with blood flow templates to determine an identity of the user. Since the first biometric sensor 3a is used for finger pressure detection, the user needs to press the user device towards the body. This increases the quality of blood flow capturing.

Optionally, the first biometric sensor 3a is a voice recognition unit. The spoken voice of a user is then captured using a microphone. The captured voice can be compared with voice templates to determine an identity of the user.

Optionally, the first biometric sensor 3a is an iris recognition unit. The iris of a user is then captured using a camera. The captured iris can be compared with iris templates to determine an identity of the user.

Optionally, the first biometric sensor 3a is an face recognition unit. The face of a user is then captured using a camera. The captured face can be compared with face templates to determine an identity of the user.

Optionally, the first biometric sensor 3a is an accelerometer, optionally combined with a gyro. The movement pattern of a user is then captured using the accelerometer and optionally the gyro. The captured movement patter can be compared with movement templates to determine an identity of the user.

Optionally, the first biometric sensor 3a is a breathalyser. Presence and/or extent of components of expired air of a user is then captured. The captured presence and/or extent of components can be compared with templates to determine an identity of the user.

Hence, the first biometric sensor 3a can comprise any suitable sensor for sensing a biometric of the user. Optionally, additional biometric sensors can be added to further improve accuracy of user identifications. More sensors imply reduces risk of false positive and false negative identifications.

Figure 3:
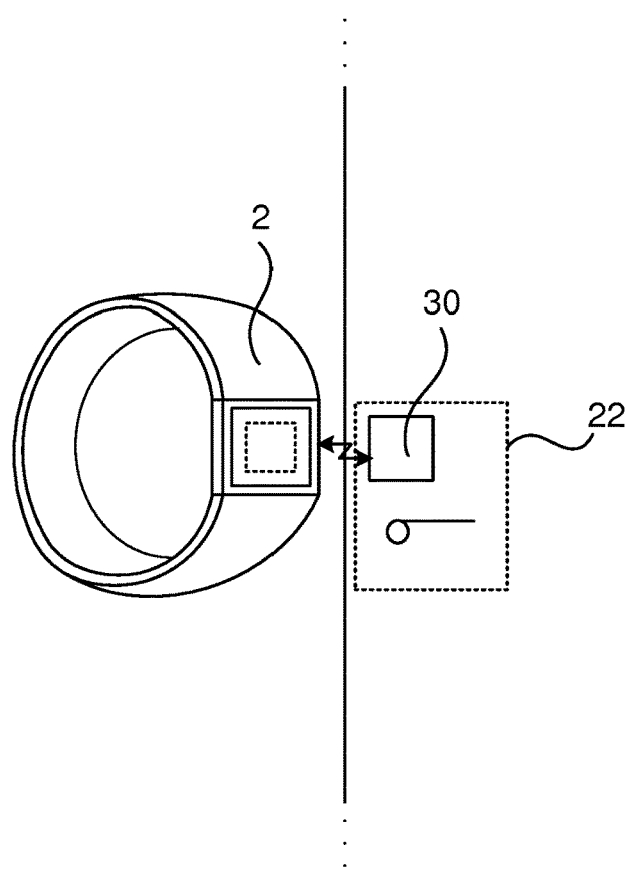
FIG. 3 is a schematic diagram illustrating the relationship between tag, user device and electronic lock in more detail.

FIG. 3 is a schematic diagram illustrating the relationship between tag, user device and electronic lock in more detail. The tag 30 can be any of the tags 30a-c shown in FIG. 1. The tag 30 is located in direct vicinity of an associated electronic lock 22, to indicate the user visually which lock the tag is associated with. The tag 30 can have a visual marking to make it easily distinguishable, which visual marking can also inform potential attackers that there is a strong security system protecting the vehicle.

The tag 30 is not used directly to control access to the electronic lock. Instead, the tag 30 is used for the user to show intent. Since the active range of communication with the tag 30 within centimetres, as long as the tags (by corresponding locks) are further away from each other than the communication range, intent is shown with great accuracy.

Figure 4:
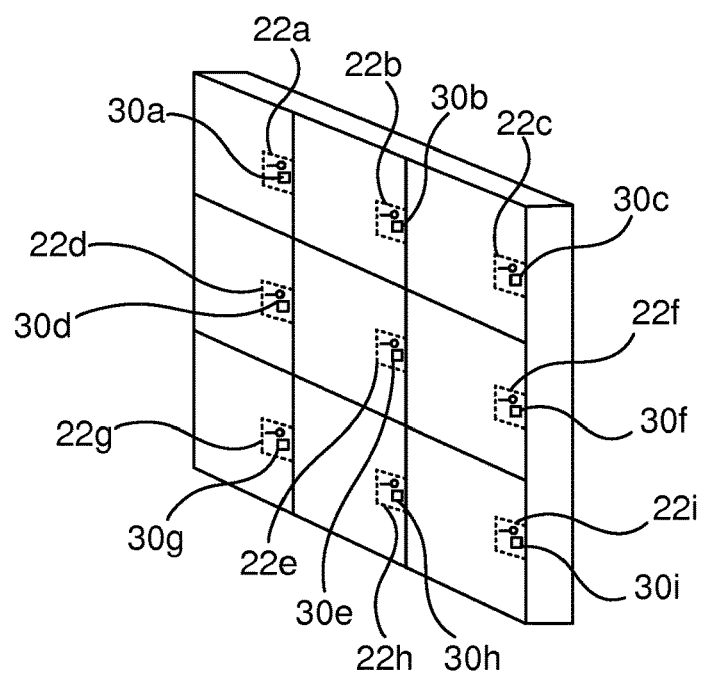
FIG. 4 is a schematic diagram illustrating an embodiment wherein the tags and electronic locks are used for lockers.

Looking now to FIG. 4, there are a number lockers with corresponding electronic locks 22a-i. Each electronic lock 22a-i has a corresponding tag 30a-i. Since the communication range is so short between the user device and the tags, the tags are also used here to shown intent with regard to which locker to open. These lockers can be placed within the vehicle to provide an extra layer of security for valuable goods. Still, the same mechanism is used here as for the doors of the vehicle, making the process simple and user friendly for the user.

Instead of, or in addition to, lockers, the goods can be secured by drawers with respective electronic locks and tags.

Instead of, or in addition to, lockers, the goods can be secured by bags with respective electronic locks and tags.

By separating intent and access control, as illustrated in FIGS. 1-3, intent can be optimised using tags while access control can be performed using communication between the lock and the user device. The communication between the lock and the user device can e.g. be performed using BLE or similar, and does not need to have the short communication range that is needed for the tags.

For access control, decentralised access delegation, DAD, can be employed. DAD solves a problem of access control without the need for a central access control system while still being able to implement flexible provision of access. In other access systems, there are local systems, which verify the identity of a presented key, or centralised systems, where access is controlled by an access control server. DAD is something entirely different from these two solutions.

In DAD, when a key (e.g. in the form of the user device) is presented for an electronic lock, the electronic lock checks that there is a valid delegation path from the electronic lock to the key. The delegation path contains a plurality of chain linked delegations which starts in the electronic lock and ends in the key. Each delegation is a delegation of an access right for the electronic lock from a delegator to a receiver. The delegation path can contain delegation(s) being locally stored by the electronic lock and delegation(s) communicated from the key. The delegation path can contain an arbitrary number of delegations. Some delegations can be authenticated using a digital signature and each delegation can be defined to have a specific validity time range.

Since the delegations are obtained from the electronic lock itself and/or from the key, the electronic lock can perform access control without needing online access. Still, using the delegation path, great flexibility is achieved in how access rights are provided. Since no central point is needed, massive scalability is achieved. Moreover, there is no single point of failure or even a master key, which improves reliability and security.

Applying DAD to the vehicle scenario herein, the vehicles can be owned by a first party, which delegates access to all electronic locks of the vehicles to a central delivery company, which delegates access to all electronic locks to a local delivery company. The local delivery company (using the access manager 7) can then delegate access on a per vehicle basis for each work shift with a corresponding validity time to conveniently provide access to a particular vehicle for the driver, but only when that driver is to use that particular vehicle. Also, the electronic locks do not need to have online access.

The decentralised access control provided by DAD can not be achieved when

RFID tags or NFC (Near Field Communication) tags are used also for access control.

Figure 5:
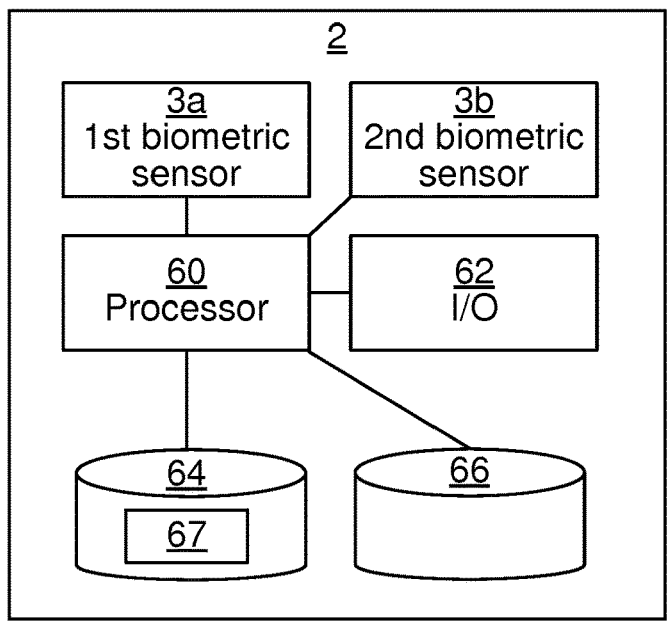
FIG. 5 is a schematic diagram illustrating components of the user device of FIG. 1.

FIG. 5 is a schematic diagram illustrating components of the user device 2 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 6 below.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM). The data memory 66 can e.g. comprise a lookup table defining a lock identifier for each tag identifier.

The user device 2 further comprises an I/O interface 62 for communicating with other external entities. Optionally, the I/O interface 62 also includes a user interface.

A transceiver of the I/O interface 62 comprises suitable analogue and digital components to allow signal transmission and signal reception with a wireless device using one or more antennas. The transceiver can include a cellular module (using e.g. LTE (Long Term Evolution) or W-CDMA (wideband code division multiple access) for data access to the Internet. Alternatively or additionally, the transceiver comprises a short-range communication module, e.g. BLE or Bluetooth for communication with a smartphone, to thereby gain data access to the Internet.

The transceiver also comprises circuitry to communicate with a tag, e.g. using NFC or RFID. The communication with the tag only works within a very short range, e.g. within 4 cm.

In FIG. 5, a first biometric sensor 3a and a second biometric sensor 3b are shown. Additional biometric sensors can be added to increase reliability of biometric identification of a user.

Other components of the user device 2 are omitted in order not to obscure the concepts presented herein.

It is to be noted that the user device 2 can be provided in two or more sections, in which case the different sections of the user device 2 can communicate with each other using a wireless link, e.g. BLE.

Figure 6:
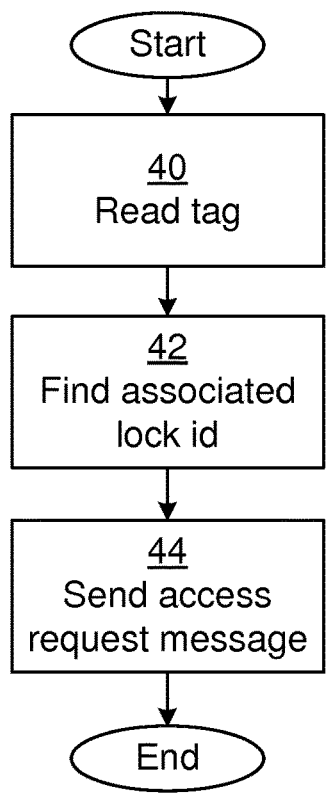
FIG. 6 is a flow chart illustrating a method for identifying a user, performed in the wearable device of FIG. 1.

FIG. 6 is a flow chart illustrating a method for requesting access to a physical space controlled by an electronic lock. The method is performed in the user device, e.g. a wearable device.

In a read tag step 40, the user device reads a tag using a near field radio protocol, yielding a tag identifier, the tag being distinct from the electronic lock. The near field radio protocol can have a range which is less than ten cm and can e.g. be RFID or NFC.

In a find associated lock id step 42, the user device finds, based on the tag identifier, a lock identifier associated with the tag identifier. The tag identifier is distinct from the lock identifier. In this way, the tags can be generic tags which are installed next to the locks. As long as the association between the tag identifier and the lock identifier is recorded, e.g. during installation, the tags can in this way be generic tags. This significantly simplifies production and installation, since there is no need to keep track of a specific pair of tag and lock during the production process and installation process.

Moreover, security is improved, since the lock identifier is not readable from the tag itself. In order to identify the lock, a lookup service needs to be consulted. A random attacker does not have access to this lookup service, whereby the attacker is unable to learn the lock identifier from the tag identifier.

In one embodiment, the step comprises using a lookup table to find the lock identifier associated with the tag identifier. The lookup table can contain all tags in an access control system and their respective lock identifiers. Since the access control is performed independently between the user device and the electronic lock, the lookup table in itself does not pose a significant security risk. The lookup table can be stored in the user device. Alternatively or additionally, the lookup table is stored centrally and is consulted by the user device when needed.

In a send access request message step 44, the user device sends an access request message to the electronic lock having the lock identifier.

Figure 7:
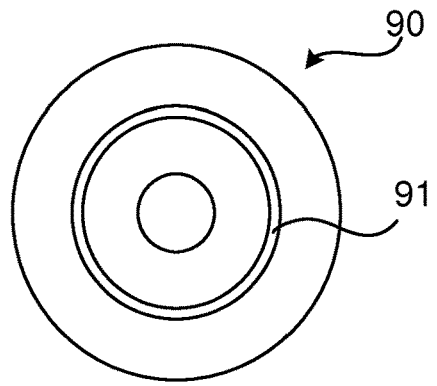
FIG. 7 shows one example of a computer program product comprising computer readable means.

FIG. 7 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments from another perspective, enumerated with roman numerals.

i. A method for requesting access to a physical space controlled by an electronic lock, the method being performed in a user device and comprising the steps of:
reading a tag using a near field radio protocol, yielding a tag identifier, the tag being distinct from the electronic lock;
finding, based on the tag identifier, a lock identifier associated with the tag identifier; and
sending an access request message to the electronic lock having the lock identifier.

ii. The method according to embodiment i, wherein the step of finding a lock identifier comprises using a lookup table to find the lock identifier associated with the tag identifier.

iii. The method according to embodiment i or ii, wherein the user device is a wearable device.

iv. The method according to any one of the preceding embodiments, wherein the physical space is within a vehicle.

v. A user device for requesting access to a physical space controlled by an electronic lock, the user device comprising:
a processor; and
a memory storing instructions that, when executed by the processor, cause the user device to:
read a tag using a near field radio protocol, yielding a tag identifier, the tag being distinct from the electronic lock;
find, based on the tag identifier, a lock identifier associated with the tag identifier; and
send an access request message to the electronic lock having the lock identifier.

vi. The user device according to embodiment v, wherein the instructions to find a lock identifier comprise instructions that, when executed by the processor, cause the user device to use a lookup table to find the lock identifier associated with the tag identifier.

vii. The user device according to embodiment v or vi, wherein the user device is a wearable device.

viii. The user device according to any one of embodiments v to vii, wherein the physical space is within a vehicle.

ix. A computer program for requesting access to a physical space controlled by an electronic lock, the computer program comprising computer program code which, when run on a user device, causes the user device to:
read a tag using a near field radio protocol, yielding a tag identifier, the tag being distinct from the electronic lock;
find, based on the tag identifier, a lock identifier associated with the tag identifier; and
send an access request message to the electronic lock having the lock identifier.

x. A computer program product comprising a computer program according to embodiment ix and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of separating intent and access control, comprising:
providing a plurality of electronic locks each controlling access to a respective physical space of a plurality of co-located physical spaces, each electronic lock having a lock identifier;
providing a plurality of tags, each tag being readable by a user device using a near field protocol to yield a respective tag identifier, each tag being provided in a vicinity of a respective electronic lock and further away from all other tags than a communication range of the user device communicating using the near field protocol, each tag being distinct from the respective electronic lock, and each tag identifier being distinct from, and not including, the lock identifier of the respective electronic lock; and associating each tag identifier with the lock identifier of the respective electronic lock using a lookup table, such that by reading a particular tag using the user device to yield a particular tag identifier, a user in possession of the user device shows intent to open the particular electronic lock in whose vicinity the particular tag is provided, obtains, via the user device, a particular lock identifier associated with the particular tag identifier using the lookup table, and sends, via the user device, an access request message to the particular electronic lock having the particular lock identifier using the user device.

2. The method according to claim 1, wherein the user device is a wearable device.

3. The method according to claim 1, wherein the plurality of physical spaces belongs to a vehicle.

4. The method according to claim 1, wherein the plurality of physical spaces is a plurality of lockers.

5. The method according to claim 1, wherein the plurality of physical spaces is a plurality of drawers.

6. The method according to claim 1, wherein the lookup table is stored in the user device.

7. The method according to claim 1, wherein the lookup table is stored centrally in an access control system of which the plurality of electronic locks forms part.

8. An access control system, comprising:
a plurality of electronic locks each configured to control access to a respective physical space of a plurality of co-located physical spaces, each electronic lock having a lock identifier;
a plurality of tags, each tag being readable by a user device using a near field protocol to yield a respective tag identifier, each tag being providable in a vicinity of a respective electronic lock and distinct from the respective electronic lock, and further away from all other tags than a communication range of the user device communicating using the near field protocol, and each tag identifier being distinct from, and not including, the lock identifier of the respective lock, and
a data memory including a lookup table associating each tag identifier with the lock identifier of the respective electronic lock, such that by reading a particular tag using the user device to yield a particular tag identifier, a user in possession of the user device shows intent to open the particular electronic lock in whose vicinity the particular tag is provided, obtains, via the user device, a particular lock identifier associated with the particular tag identifier using the lookup table, and sends, via the user device, an access request message to the particular electronic lock having the particular lock identifier using the user device.

9. The access control system according to claim 8, further comprising the plurality of co-located physical spaces.

10. The access control system according to claim 9, wherein the plurality of co-located physical spaces is a plurality of lockers.

11. The access control system according to claim 9, wherein the plurality of co-located physical spaces is a plurality of drawers.

12. The access control system according to claim 8, further comprising the user device.

13. The access control system according to claim 12, wherein the lookup table is stored in the user device.

14. The access control system according to claim 12, wherein the user device is a wearable device.

\* \* \* \* \*